Aug. 30, 1949.　　　　A. H. KIRKSEY　　　　2,480,413
COUPLING APPARATUS
Filed Oct. 12, 1945　　　　　　　　　　　　3 Sheets-Sheet 1

AMOS H. KIRKSEY
INVENTOR.

BY
Atty.

Aug. 30, 1949.　　　A. H. KIRKSEY　　　2,480,413
COUPLING APPARATUS

Filed Oct. 12, 1945　　　3 Sheets-Sheet 2

Amos H. Kirksey
INVENTOR.

BY Francis D. Ammen
Atty.

Aug. 30, 1949.   A. H. KIRKSEY   2,480,413
COUPLING APPARATUS
Filed Oct. 12, 1945   3 Sheets-Sheet 3
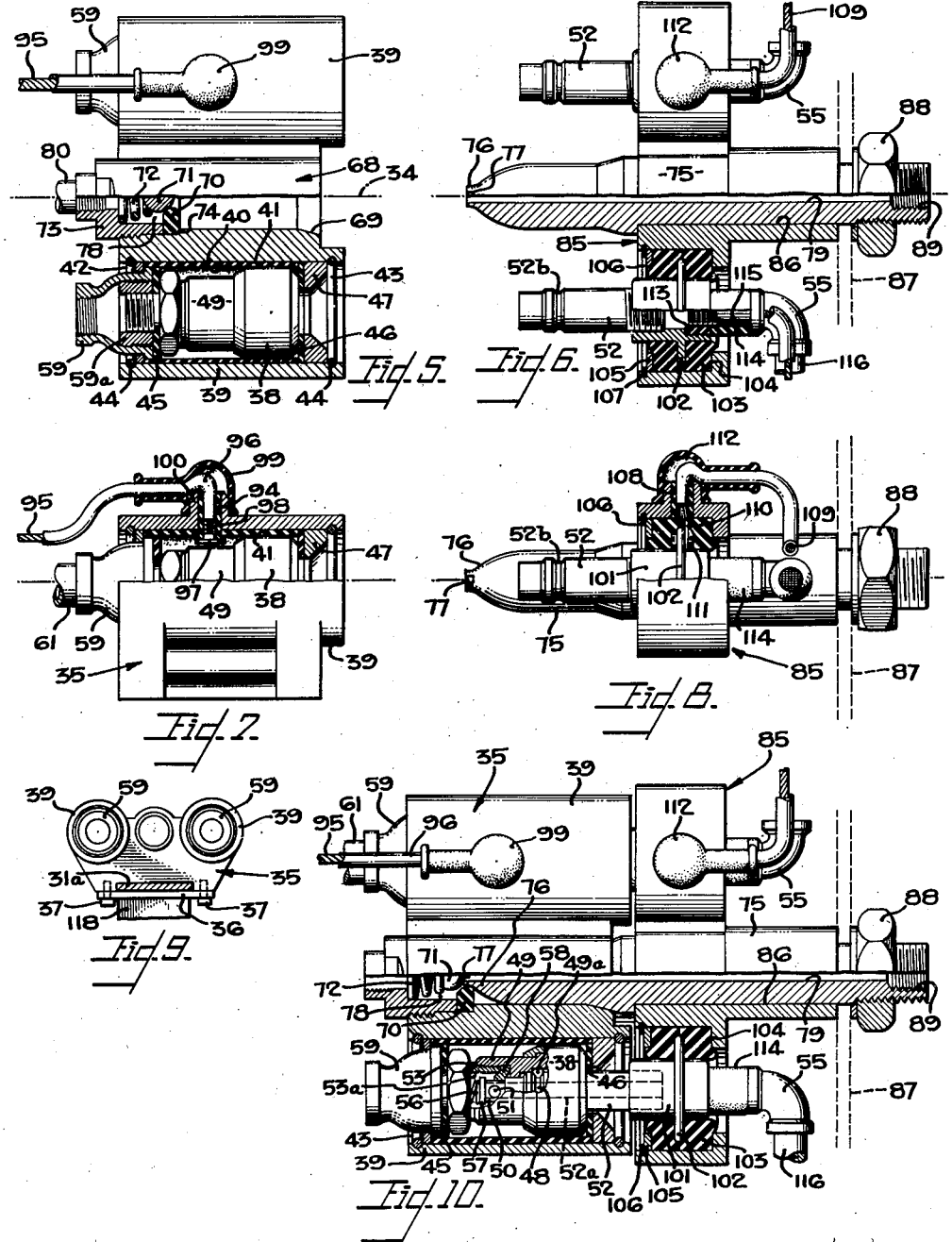
Amos H. Kirksey  INVENTOR.
BY Francis D. Ammen
Atty.

Patented Aug. 30, 1949

2,480,413

UNITED STATES PATENT OFFICE 2,480,413

COUPLING APPARATUS

Amos H. Kirksey, Vernon, Calif.

Application October 12, 1945, Serial No. 621,994

13 Claims. (Cl. 280—33.05)

This invention relates to a coupler for coupling service lines of a towing vehicle to a trailer or semi-trailer. The invention is particularly applicable to the type of trailer in which a traction coupler mechanism is provided at the forward end of a trailer or semi-trailer to couple it to the towing vehicle or truck when the truck is backed in under the forward end of the semi-trailer. When this occurs the king pin at the fifth wheel or coupler plate on the towing vehicle is automatically coupled to a traction coupling member or mechanism carried on the trailer or semi-trailer. These trailers or semi-trailers are, of course, provided with fluid operated brakes, usually pneumatic operated; and also must carry lights for night driving. This requires the provision of the service lines on the truck or towing vehicle to be coupled to corresponding delivery lines or service lines on the trailer or semi-trailer.

An object of the present invention is to provide service coupling members for automatically coupling the service line on the towing vehicle or truck to the service line installation on the trailer.

Service couplings or coupler elements, such as described, are obtainable on the market, and one of the objects of the present invention is to provide means for mounting the coupler members on the towing vehicle in such a way as to insure their proper axial alignment with the corresponding coupler members that are carried in a substantially fixed position on the trailer or semi-trailer; in other words, in accordance with my invention, I provide a construction enabling coupling elements of such service lines to be mounted on the semi-trailer and on the towing vehicle in such a way that they will couple themselves together automatically when the towing vehicle is backed into position for connecting it to the semi-trailer through traction coupler.

Another object of the invention is to provide means associated with the traction coupler, capable of being operated through one of the service line couplings to enable the traction coupler to be released from the driver's position in the truck or towing vehicle.

Another object of the invention is to provide a mounting for a pneumatic service coupler now in common use that will enable an insulated electric connection for a lamp circuit to be established through it.

My invention is particularly adapted for application to truck and trailer combinations of a type in which there is considerable variation in different trailers that are to be coupled to the same truck as regards the amount of movement that must be imparted to the movable coupler members on the truck to effect the closing of the traction coupler, and one of the objects of my invention in addition to effecting the necessary longitudinal alignments referred to above, is to provide for accommodating any amount of variable over-ride that the movable coupler members must take in order to accommodate different models or types of trailers.

Further objects of the invention will appear hereinafter.

The invention consists in the novel parts and combinations of parts to be described hereinafter, all of which contribute to produce an efficient coupling apparatus for service lines including electric circuits.

A preferred embodiment of the invention is described in the following specification, while the broad scope of the invention is pointed out in the appended claims.

In the drawing:

Figure 1 is a plan showing the rear end of a truck or towing vehicle and illustrating the same in alignment with, and being backed into position under, the forward end of a trailer or semi-trailer. The rear portion of the trailer is broken away. This view shows the traction coupler mechanism of the trailer or semi-trailer in a position ready to close upon the king pin which is carried by the truck or towing vehicle.

Figure 2 is a view similar to Figure 1, but showing the coupling operation at a later, or more advanced stage, and this view illustrates how the guiding means provided on the trailer cooperates with means that I provide on a truck or towing vehicle to effect alignment of the coupler members carried on the towing vehicle, with the service coupling members that are carried in a relatively fixed position at the forward end of the trailer or semi-trailer.

Figure 5 is a plan and partial section of a gang casing, or multiple casing, for the pneumatic couplings, and particularly illustrating the means for mounting and insulating the coupler members that are carried by the towing vehicle. This view also illustrates in plan one of the electric coupler heads.

Figure 6 is a view corresponding to Figure 5, illustrating the corresponding coupler members that are carried by the trailer or semi-trailer, and showing their construction and mounting.

Figure 7 shows the casing illustrated in Figure 5, in side elevation up to the level of the axes of the coupler members, and above that point in section, together with a section of the electrically insulated coupler head.

Figure 8 is a corresponding view to Figure 7 and showing the side elevation and partial section of casing and mounting for the coupler members that are carried on the trailer or semi-trailer.

Figure 9 is a view taken about in the plane of the line 9—9 passing through the upper leaf of the guide arm for the coupler members that are carried by the towing vehicle, but in this view the connections to the forward ends of these coupler members are omitted. This view illustrates particularly how the carriage or casing for the vehicle coupler members is guided on the guide arm.

Figure 10 is a plan of the coupler members or coupler member assembly carried by the trailer or semi-trailer showing one half in plan, and the other half illustrating the mounting means for one of the pneumatic couplers; also showing this pneumatic coupler in partial section to illustrate its mode of operation.

Figures 1, 2:
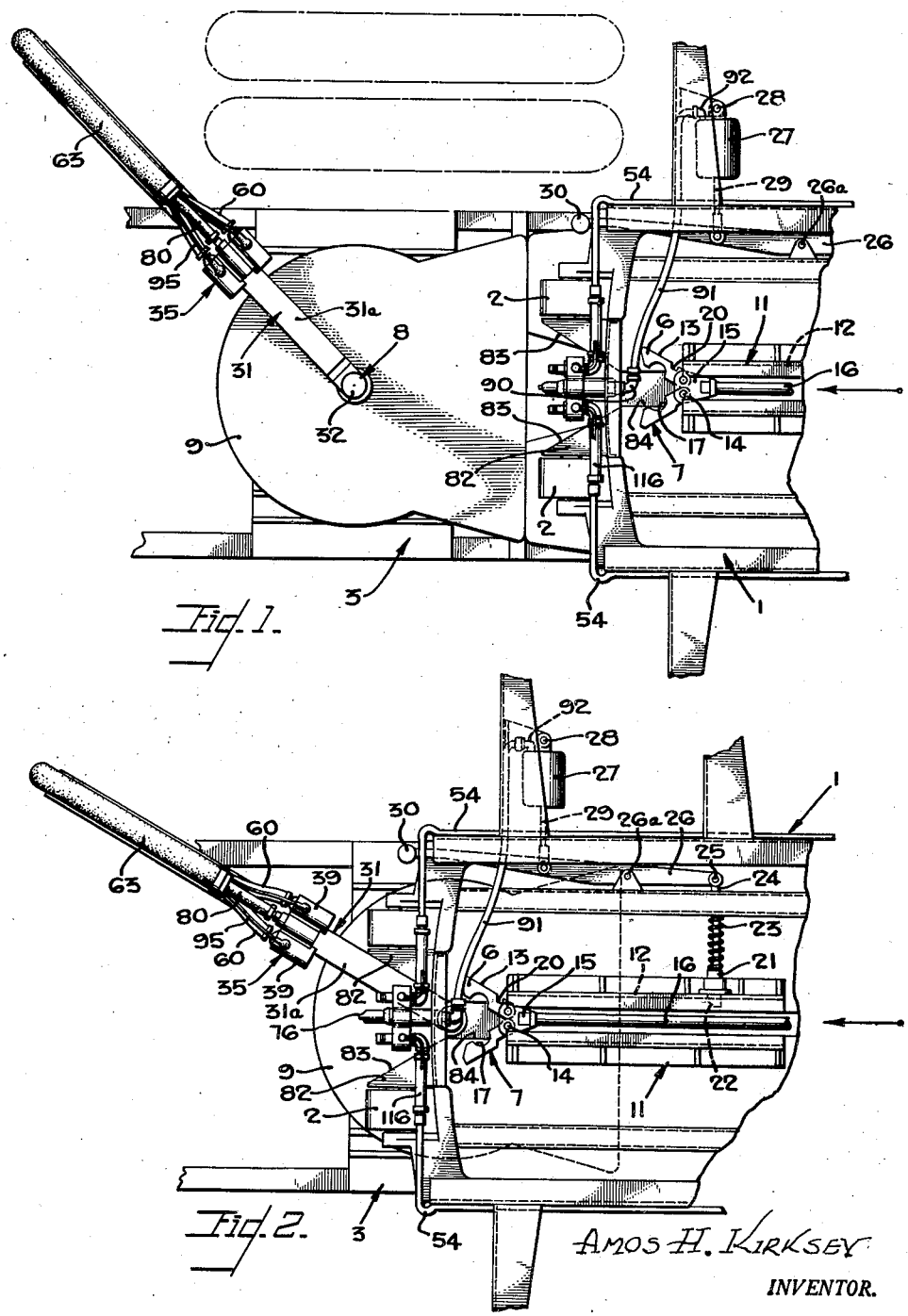
Figure 3:
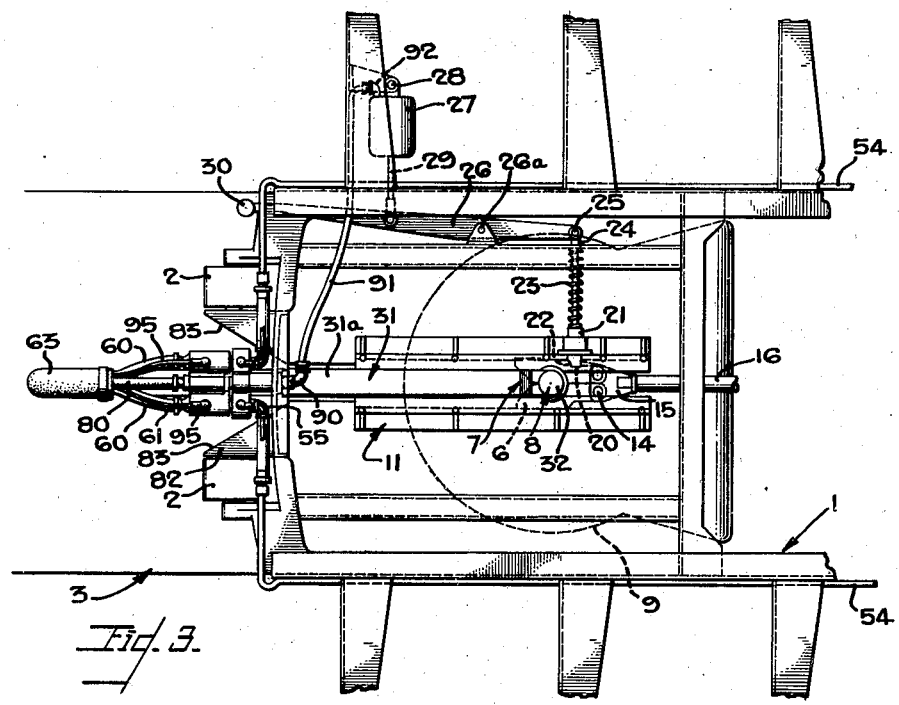
Figure 3 is another view similar to Figures 1 and 2, and indicating the relation of the parts after the operation of coupling on the trailer to the truck has been completed.

Referring more particularly to the parts and especially to Figures 1 to 4 inclusive, 1 indicates the forward end of the frame of the trailer or semi-trailer. In the semi-trailer illustrated its forward end carries a pair of rollers 2. In this type of semi-trailer the towing vehicle is backed into coupling position in longitudinal alignment with the trailer and so that the rear end 3 of the towing vehicle moves in under the forward end of the trailer frame 1. The rollers 2 then roll up on the inclined surface 4 of a ramp 5 that is carried on the towing vehicle 3.

Although my improvement is described as applied to a towing vehicle and semi-trailer having these features of construction, it should be understood that it is not essential to the practice of my invention to have these parts constructed as described. The ramp 5 brings the jaws 6 of the automatic clutch 7 of the traction coupler up to the level of the kingpin 8 (see Figure 4) that is carried on a coupler plate 9. In the present instance this coupler plate or fifth wheel plate 9 is constructed in the usual manner, as a teeter or tilting plate mounted to swing on a horizontal pin 10 so that it can assume an inclined position in which its upper face operates as an extension of the inclined ramp face 4, to receive the rollers 2 when they ride up on the ramp.

When the towing vehicle is being backed into position in the manner suggested, the jaws 6 of the automatic clutch or traction coupler 7 on the semi-trailer are in the open position illustrated in Figure 1. At this time they are shoved forwardly out of their coupler guide 11 which presents guide plates or cheeks 12 at each side to guide the flat outer faces 13 of the jaws 6. These jaws 6 are attached by vertical pivot pins 14 to a coupler head 15, and this coupler head is attached to a rod 16 that is held automatically in a forwardly thrusted position at the coupling time. The usual springs (not illustrated), hold the jaws 6 in their open position so that their half-round sockets 17 are ready to receive the traction pin or kingpin 8.

During the coupling movement, as the rollers 2 pass beyond the horizontal pivot pin 10 of the fifth wheel plate, the pressure exerted by them compresses the spring 18 (see Figure 4) that has been holding the teeter plate 9 in its inclined position, after which the bottom face 19 of the frame of the trailer will lie flat upon the upper face of the teeter plate which then assumes a substantially horizontal position. In this movement, as the kingpin 8 moves back into the angle between the two traction coupler jaws 6, it pushes these jaws and the coupler head 15 back so that the jaws assume the position or relation indicated in Figure 3, at which time their half-round sockets 17 engage opposite sides of the kingpin to hold the trailer coupled to the towing vehicle for traction purposes.

In accordance with my invention I provide releasable automatic means for locking the traction coupler 7 in its closed position and so as to prevent it from being pulled out of its guides 11 by the kingpin. For this purpose I provide one of the jaws 6 with a recess or notch 20 which is adapted to come into position opposite the nose of a locking bolt 21 which constitutes a part of my releasable locking means. This locking means is constructed so that it is remote-controlled by means within reach of the driver. In the present instance this is a pneumatic valve in the cab of the towing vehicle. This avoids the necessity for the driver getting down from the truck to do this. In order to enable the nose of the locking bolt 21 to move automatically into its notch 20 when the traction coupling is closing, I provide the forward side of the nose of this bolt 21 with an inclined face 22; and as the adjacent side face of the adjacent jaw 6 moves relatively rearwardly when the coupling is being effected, this inclined face 22 enables the adjacent jaw 6 to move the locking bolt 21 outwardly against the force of its coil spring 23 which is disposed around its shank. The locking bolt 21 is shown as provided with a long stem 24 around which a spring 23 is placed and the outer end of this stem is attached to a knuckle 25 that is pivoted to an operating lever 26. This lever 26 can be operated at will from the driver's position as suggested, by a remote controlled device, and in the present instance this device is illustrated as including a pneumatic cylinder 27, the rear end of which is pivotally supported on a fixed bracket on the frame at 28 and located opposite to the piston rod 29 that extends from the inner end of the pneumatic cylinder, and is attached pivotally to the operating arm of the lever 26. The travel of this bolt is short so that the pivot at knuckle 25 can swing freely in its arc about the fulcrum pin 26a.

The lever 26 is extended beyond its point of connection to the piston 29, and its forward end is provided with a handle 30 to enable the lockbolt 21 to be operated by hand if desired.

In the present instance pneumatic connections are effected to the pneumatic cylinder 27 as soon as the towing vehicle has been coupled to the trailer or semi-trailer. This coupler means for effecting the coupling of the service lines on the towing vehicle to the service lines on the trailer include lines for operating fluid, such as pneumatic lines which operate by the use of vacuum apparatus, or by means of compressed air; and also include electrical contact features associated with the coupling members for enabling an electric circuit, such as a light circuit to be established automatically from the towing vehicle to the trailer or semi-trailer when the pneumatic couplings are closed.

The construction and means for mounting the service couplings will now be described, reference being had particularly to Figures 5 to 10 inclusive that show the details of this coupling apparatus. However, referring still to Figures 1 and 2, I provide at the upper side of the coupler plate 9, a guide 31 which is mounted to swing about a substantially vertical pivot while resting upon the upper surface of the coupler plate 9. In order to accomplish this I prefer to mount the inner end of this arm 31 pivotally on the kingpin 8. This arm is preferably bifurcated, and as here illustrated, is made of relatively wide strap metal and includes an upper fork or leaf 31a (see Figure 4), the rear end of which may be offset downwardly to form a shank that is attached on the end of the kingpin by a bolt 32. In the present instance the lower leaf 31b of the guide arm 31 is preferably pivoted on the kingpin, and lies flat on the upper face of the coupler plate 9, but projects forwardly from the same a considerable distance; and this lower leaf 31b is connected to the upper leaf 31a integrally by a forwardly disposed bow or bight 33 (see Figure 4).

The coupling connections for the service lines include two coupling connections that are substantially alike and in the present instance located symmetrically on opposite sides of the front-and-rear axis 34, as illustrated in Figures 5 to 10. The service couplers that are on the towing vehicle are preferably mounted on a carriage 35 that is guided to slide on the upper leaf 31a (see Figure 9). As illustrated in Figure 9, the carriage 35 has a guide slot extending in a front-and-rear direction that receives the leaf 31a of the guide arm which is held in this recess or socket by a transverse cap plate 36 secured in place by bolts 37. The main pneumatic couplers are of twin type, that is, they include two twin coupler members 38 carried respectively in substantially cylindrical casings or barrels 39 supported on the carriage 35. As these coupler members 38 are alike, it will only be necessary to describe in detail the one that is shown in section in Figures 5 and 10. Each barrel 39 is formed with a cylindrical bore 40 having an insulating liner 41 of suitable insulation material, and this liner is held in place by retaining spring rings 42 and 43 seated in annular grooves 44 near the rear end and forward end of the bore.

At the forward end of the bore 40 an insulating washer or ring 45 is provided as shown, and at the rear end an insulating disk 46 is provided, against which a keeper ring and guide 47 seats, being held in place by its corresponding spring ring 43. This coupler member 38 has a construction which cuts off communication through the coupler when it is in uncoupled condition and prevents escape of compressed air from it, or impairment of a partial vacuum existing within it. In other words, it includes a valve which is maintained closed automatically when the coupler member 38 is in its uncoupled state. A coupler that meets these requirements is illustrated in Patent No. 2,092,116 of September 7, 1937, granted to one Fred E. Hansen.

Referring particularly to Figure 10, this coupler includes a valve closure 48 of tubular form, guided to slide in an inner sleeve 49. The valve closure 48 has a reduced neck 50 at its forward end with ports 51 through its wall that communicate with the duct 52a within the valve closure 48. When the corresponding coupler member 52 on the trailer telescopes within the coupler member 38 it pushes the valve closure 48 relatively forwardly in the inner sleeve 49 and opens up communication for pneumatic control; if compressed air is employed, then flow of compressed air will occur from the chamber 53a in the nipple 53 that clamps valve gasket 58 in the inner sleeve 49; then the flow is through the ports 51 into the bore of the valve closure 48, and thence through the bore 52a of coupling member 52 of the trailer to the corresponding service line 54 on the trailer. Connection is had to this line 54 through the elbow 55. The valve 48 is normally held closed by its coiled spring 56 that holds the closure head 57 of this valve against a flexible gasket or disk 58 carried on the inner sleeve 49.

The pneumatic connection into the forward end of the coupler member 38 is effected through a threaded pipe fitting 59 to which a flexible connection or hose 60 is attached through a suitable coupling 61.

The nipple 53 has a nut form head with an integral nipple on its other side that is threaded into an insulating bushing 59a in the fitting 59 (see Fig. 5).

The coupler member 52 has a circumferential groove 52b that cooperates with a spring pressed detent pawl 49a (see Figure 10) carried in the wall of the inner sleeve 49. When the coupler member 52 telescopes into the coupler member 38, this detent pawl holds the coupler member 52 yieldingly in position.

Most of the length of this hose is housed in a sheath 63 referred to hereinafter, which is supported on a hanger plate 62 from the under side of the lower leaf 31b of the guide arm 31, and from this point the sheath extends downwardly to form a loop 63a beyond which the rear end of the hose 60 is connected by a suitable coupling 64 to a pipe connection 65 fixed on the truck frame. Each pipe connection 65 is connected to a corresponding service pipe 66 that extends forwardly on the towing vehicle and up into the driver's cab where it is attached to a pneumatic valve such as valve 67 (see Figure 4).

It is understood, of course, that there is a valve 67 corresponding to each of the coupler members 38 in the driver's cab so that he can open up a vacuum to atmosphere or admit compressed air into either of the service lines 54 on the trailer, depending upon the type of pneumatic control that is employed.

In practice, of course, the service lines 54 lead to the trailer brakes (not illustrated), and any other pneumatically operated accessories that may be carried by the trailer. For establishing connection to the air cylinder 27, I provide a coupler member 68 (see Figure 5) which in the present illustration is located on the axis line 34 midway between the two coupler casings 39. This coupler member 68 has a substantially cylindrical bore 69, the forward end of which is provided with a valve seat 70 of rigid insulating material, and this valve seat is in the form of a ring with a central valve opening that is normally held closed by a ball valve 71 held on its seat by a coil spring 72. This coil spring is carried in a bushing 73 threaded into the adjacent end of the bore 69. The inner end of this bushing holds the ring 70 against its shoulder or seat 74 in the forward end of the bore 69. When the corresponding coupler member 75 on the trailer moves relatively forwardly into the bore 69 its nose 76 impinges upon the ball 71, and moves it off the seat. This nose 76 is formed with ports in the form of notches such as the notch 77 which permit establishment of communication from the valve chamber 78 into the longitudinal duct 79 of the coupling member 75.

The forward end of the bushing 73 is connected to a suitable flexible connection or hose 80 (see Figure 1). This hose 80 and the two hoses 63, already described, are all carried in a large hose or sheath 63 (see Figures 1 and 2), which sheath or outer hose 63 lies on the upper side of the upper leaf 31b of the arm 31 when the carriage 35 is located in the relatively rearwardly disposed position on the arm 31, where it is located when the service coupling is open.

Referring again to Figures 1 and 2, the forward end of the trailer frame 1 is provided with two guide plates 82 having guide edges 83 that diverge in a forward direction, and the rear ends of these diverging edges 83 are connected up to the side edges 84 of a guide slot into which the kingpin passes when the traction coupling is being established. In other words, as the rearwardly converging edges 83 arrive at the location of the arm 31 they will engage this arm and swing it around into a front-and-rear position so that its axis will coincide with the main axis line 34 referred to in connection with Figures 5 to 10. In this way the carriage and the pneumatic couplings carried by it will be aligned with their corresponding coupler members carried on the trailer.

The coupling members carried on the trailer are also supported in an assembly, including a fixed coupling casing 85 having a central bore 86 in which the coupling member 75, already referred to, is tightly fixed and the rear end of this coupling member 75 may be used as indicated at the right in Figure 6 to enable it to be secured to a transverse frame member 87, indicated in dotted lines in Figures 6, 8 and 10. In order to accomplish this, the rear end of the casing 85 seats against the forward side of this transverse frame member, and the rear end of the coupling member 75 passes through an opening in the frame member, and is clamped in place by a nut 88 attached on external threads at the rear end of the coupling member 75. The rear end of the coupling member 75 is provided with a threaded socket 89 for connection to an elbow 90, from which a pipe connection 91 extends over to the rear end of the air cylinder 27 to which it is connected through an elbow 92.

Figure 4:
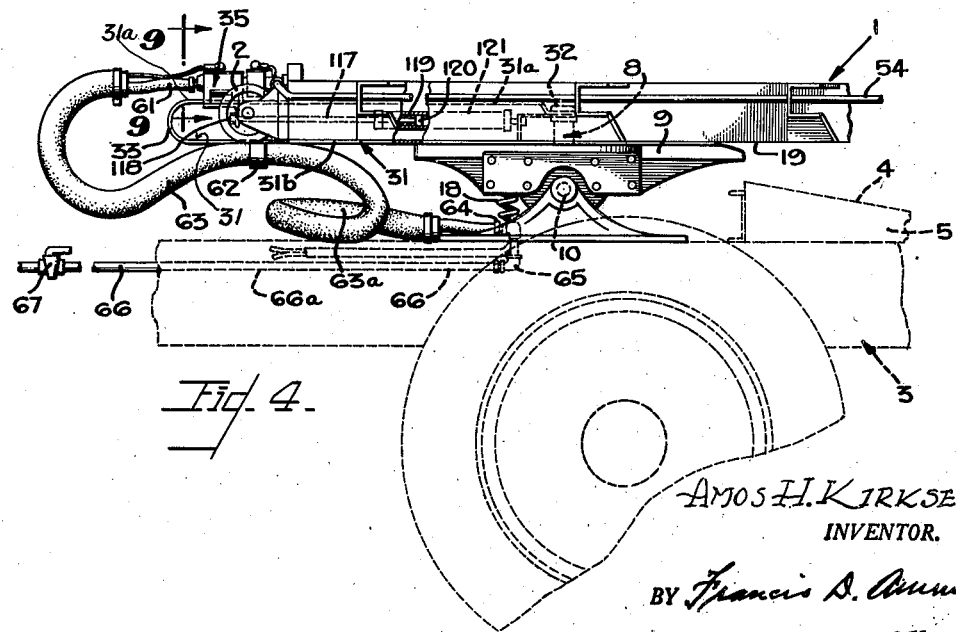
Figure 4 is a side elevation of the parts illustrated in Figure 3, but showing the same with the wheels and a portion of the chassis of the towing vehicle in dotted lines.

It should be understood that the middle pipe 66a indicated in dotted lines in Figure 4 is extended forwardly on the towing vehicle like the pipes 66, and also extends up into the driver's cab where a valve such as the valve 67 would be provided for effecting the operation of this cylinder. This service connection is, of course, completed when the nose 76 of the coupler member 75 pushes the ball valve 71 off of its seat, as illustrated in Figure 10.

I shall now complete the description of the insulation and mounting for the coupler members 38 which I utilize to carry the electric current from the electric service lines on the towing vehicle back through the lighting circuit on the trailer. In order to accomplish this I provide an insulated bushing 94 in an opening in the upper side of each of the casings 39, and through this bushing I effect an electrical connection from a service cable 95 supplied with current from a generator or battery on the towing vehicle. This cable 95 is, of course, carried in an insulating sheath 96, and the end of the cable 95 within the bushing is preferably attached to a brush 97. The inner end of this brush is formed with a concave recess to permit it to ride on the cylindrical outer face of the inner sleeve 49 described in connection with the details of these coupling members 38 illustrated in Figure 10. A small coil spring 98 back of this brush (see Figure 7) holds this brush firmly against the side of the inner sleeve 49 of the coupling 38 at all times.

This sheath 96 where it passes into the bushing 94 may be encased in a suitable insulating hood 99, having a mouth below which fits tight over a nipple 100 projecting up from the upper wall of the casing 39.

I shall now describe how the electrical connection is established to the parts 48 of the coupling members 38, that are carried by the trailer. These coupling members or parts 48 have been referred to in connection with the description of the detail construction illustrated in Figure 10. Each part 52 is secured at its rear end to a sleeve 101 (see Figures 6, 8 and 10). This sleeve is formed with a circumferential flange 102 at about its middle portion and is carried insulatingly in an insulating block or bushing 103. As indicated in Figs. 6 and 10, this insulating block is preferably formed of two sections located on opposite sides of the flange 102. This bushing is carried in a socket 104 in an extension that projects laterally from the body portion of the casing 85. The insulating block 103 is inserted into the socket from the front and is retained there by a keeper ring 105, or washer, held in place by a spring ring 106 seated in an annular groove 107 undercut into the wall of the socket. This holds the insulating block 103 against the bottom of the socket.

As indicated in Figure 8, the upper wall of the socket 104 is provided with an insulating bushing 108 somewhat similar to the bushing 94 described in connection with Figure 7, and through this bushing the end of the trailer cable 109 passes down to a point near the side of the insulating block 103 at which point it is provided with a leading in wire 110 that is attached to the flange 102 by a small screw 111. The adjacent portion of the insulated cable is encased in a hood 112 of insulating material mounted on the upper wall of the socket in the same manner as the hood 99.

As shown in Figure 6, the metal elbow 55, which operates to connect up the coupler member 38 to the pipe line 54, is insulated from the sleeve 101 through the agency of an insulating bushing 113 and an insulating split collar 114 that is disposed around the metal nipple 115 that connects elbow 55 to the sleeve 101.

The elbows 55, however, are not connected directly to the service lines 54 on the trailer, but are connected to the same through flexible couplings 116 respectively (see Figure 2).

Referring again to the coupling connections 38 and 48, it should be understood that in ordinary practice these parts are constructed of metal, which would be conductive to an electric current so that when these coupling members are brought together a good electrical contact is effected from the coupler member 38 on the towing vehicle to the coupler member 48 on the trailer, and as these coupling members are insulated from the frames that carry them, a good electrical connection is established through these couplers to the trailer circuit. However, in case, for any reason, it is not desired to construct the coupling members 38 and 48 of metal they should be provided each with a metal part that is connected to its corresponding cable end; and these two metal parts, of course, must be in contact with each other when the couplings are closed.

When the truck or towing vehicle is backed in to establish the traction coupling, the rear end of the truck 3 that carries the ramp 5 will move in under the rollers 2 and lift the same as the truck backs into position. Toward the end of the backing movement the arm 31 will come into engagement with the edges 83 of the guide members 82 on the forward end of the trailer, and these edges, converging as they do toward the rear, will operate to swing the guide arm 31 into a front-and-rear position so that all three of the coupler members on the arm will be in line with the coupler members on the trailer. At this time the carriage 35 and the coupler members carried by it on the arm 31 is located in an intermediate position along the length of the guide arm 31. In different trailers and semi-trailers having traction couplers such as that described, including the kingpin 8 and the jaws 6, there is considerable difference in the amount of rearward movement that is required to carry the kingpin and the locking jaws 6 back to their locking position. For this reason I provide means for resiliently and yieldingly resisting the relative forward movement, of the tractor's couplers when they are engaged and telescoped with their corresponding coupler members on the trailer. This means is illustrated in Figure 4 and preferably includes a rod 117, the forward end of which is anchored to a bracket flange 118 that projects down from the under side of the keeper plate 36; and this rod is associated with a coil spring 119 disposed around it, thrusting against the head 120 on the rod, so that when the carriage is pushed forwardly relatively, this spring 119 will be compressed, and will resist this movement. If desired the head 120 can be constructed so that it can function as a substantially air tight piston in a cylinder 121. The forward end of this cylinder, can operate as a check pot to cushion the relative forward movement of the carriage 34 and the couplers carried thereby.

One of the advantages of my invention is that the means by which I support the coupler carriage 35, has flexibility up and down, that is, in a vertical plane. In other words, the swinging of the arm on the kingpin, provides for proper alignment of the coupling members in a vertical plane; and as they telescope with each other, the upper fork 31a of the arm 31, moves up or down to effect perfect axial alignment of the coupling members as they telescope with each other. The bow or bight 33 at the forward end of this arm 31, cooperates in attaining this up-and-down flexibility for the upper fork of the arm.

Although I have described this invention as adapted for use with pneumatic means, or compressed air as the operating fluid, it should be understood that I do not limit myself to such use for it is obvious that it could be useful where hydraulic fluid is employed in the connected service lines.

Many other embodiments of this invention may be resorted to without departing from the spirit of the invention.

I claim as my invention:

1. In a coupler for coupling service lines on a towing vehicle, to a trailer, the combination of a tilt-member mounted to tilt on a transverse axis at the rear end of the towing vehicle frame, a king pin projecting up therefrom, a service coupler arm mounted on the tilt-member to swing about a substantially vertical axis, a coupler carriage guided to move along the arm, a trailer coupler member on the forward end of the trailer frame, means for effecting alignment of the said arm with the trailer coupler member when the trailer and towing vehicle are moved into coupling position to couple their traction coupling members, and means for yieldingly resisting the relative forward movement of the carriage occasioned by the impingement of the trailer coupler member therewith.

2. A service line coupler combination according to claim 1 in which the said arm is pivotally mounted on the king pin.

3. A service line coupler combination according to claim 1 including a relatively fixed outlet for operating fluid carried on the rear end of the towing vehicle, and a flexible connection connecting the same to the coupler member on the said arm.

4. In a coupler for coupling service lines on a towing vehicle, to service lines on a trailer; the combination of a traction coupler plate, means carried respectively on the towing vehicle and on the trailer for effecting a traction coupling between the towing vehicle and the trailer, a service coupler arm mounted on the coupler plate to swing about a substantially vertical axis, a vehicle coupler member guided to slide on said arm, a trailer coupler member for the service lines on the forward end of the trailer frame, means for automatically effecting alignment of the said arm with the trailer coupler member when the trailer and towing vehicle approach each other to connect their traction coupler members to each other, and means for yieldingly resisting relative forward movement of the said vehicle coupler occasioned by the impingement of the trailer coupler member upon said vehicle coupler member during the coupling movement.

5. In a coupler for coupling service lines on a towing vehicle, to service lines on a trailer; the combination of a traction coupler plate, means carried respectively on the towing vehicle and on the trailer for effecting a traction coupling between the towing vehicle and the trailer, a bifurcated service coupler arm mounted on the coupler plate to swing about a substantially vertical axis, including an upper fork with means for supporting the same for flexing in a vertical plane, a coupler member guided to move along the upper fork of said arm, a trailer coupler member for the service lines on the forward end of the trailer frame, means for automatically effecting alignment of the said arm with the trailer coupler member when the trailer and towing vehicle are brought together for coupling the traction coupling members to each other, and means for yieldingly resisting relative forward movement of said coupler carriage occasioned by the impingement of the trailer coupler member upon said first named coupler member.

6. In coupler apparatus for coupling a towing vehicle to a trailer or semi-trailer having a fluid-brake service line, the combination of automatically operating traction coupler means for effecting a traction coupling between the rear end of the towing vehicle and the forward end of the trailer when the towing vehicle and trailer are brought together for coupling the same, automatically operated locking means for locking the traction coupler in its coupled relation when the towing vehicle and the trailer are brought together, remote controlled releasing means on the trailer for releasing the locking means, means including fluid coupling members for brake operating fluid, for effecting a service line connection from the towing vehicle to the trailer brake service line and to said releasing means through said fluid coupling members, and means for operating the same from a point on the towing vehicle.

7. Coupler apparatus according to claim 6 in which the traction coupler includes a member having a socket in its outer face, and the locking means includes a bolt to enter said socket to lock the traction coupler closed.

8. Coupler means according to claim 6 in which the locking means includes a socket, and draw bolt cooperating therewith to lock the traction coupler closed, and in which the draw bolt has a nose with an inclined cam face enabling the bolt to snap into the socket when the traction coupling is being closed.

9. In a combined pneumatic and electric coupler for connecting a towing vehicle to a trailer or semi-trailer, the combination of a towing vehicle frame, a pneumatic connection carried on said frame including a pneumatic coupler member having a conductive part and including a valve closure, a spring associated with the valve closure for holding the same closed and in an extreme rearwardly disposed position when the pneumatic coupler member is in its uncoupled state, means for insulatingly supporting the pneumatic coupler member on said vehicle frame; a trailer frame, a second pneumatic coupler member, carried on said trailer frame, including a conductive part to cooperate with the first named coupler member and having means for engaging said valve closure to force the same forwardly to an open position when the towing vehicle and trailer are moved together to couple the same, to effect a pneumatic connection through the coupler members with said conductive parts in contact with each other, means for insulatingly supporting said second named coupler member on the trailer frame, an insulated electric conductor on the towing vehicle frame, a contact connected with said insulated conductor for connecting the same to the first named coupler member, an insulated electric conductor carried by the trailer frame with a contact connected thereto in electrical contact with the second named coupling member; all of said parts cooperating to establish an insulated pneumatic circuit through the said pneumatic coupling members when the same are coupled together; automatic means for effecting a traction coupling connection between the towing vehicle and the trailer when the said towing vehicle is backed into said trailer, and means associated with the towing vehicle for yieldingly resisting forward movement of the first named pneumatic coupler member when the trailer's pneumatic coupler member is forced against the first named coupling member to establish the said pneumatic connection.

10. A combined fluid and electric coupler for connecting a towing vehicle to a trailer or semi-trailer, according to claim 9, including a guide arm and a coupler carriage guided on the same, and means on the trailer for swinging the guide arm into a front and rear position to effect the aligning of the coupler members on the towing vehicle, with the coupler members on the trailer.

11. In a combined fluid and electric coupling for connecting a towing vehicle and trailer having a fluid controlled brake service line on the trailer, and a fluid service supply line on the towing vehicle, the combination of a fluid service coupler-member on the towing vehicle with means for insulatingly supporting the same, a fluid service coupler-member with means for insulatingly supporting the same on the trailer, said fluid coupler-members constructed so as to couple together automatically when brought together, to connect the fluid service line on the towing vehicle to the brake service line on the trailer, an insulated electric conductor on the towing vehicle, located outside of said fluid service connections, in electrical contact with the first-named insulated coupler-member, an insulated electric conductor carried by the trailer frame, located outside of said fluid service connections, in electrical contact with the second-named fluid service coupling member; all of said parts cooperating to establish an insulated electric circuit through the said conductive pneumatic coupling members when the same are coupled together.

12. In a combined pneumatic and electric coupler for connecting a towing vehicle to a trailer or semi-trailer, the combination of a pneumatic connection adapted to be carried on the towing vehicle including a pneumatic coupler-member having a conductive part, and including a valve-closure, means for normally holding the valve-closure in its closed position, means for insulatingly supporting the pneumatic coupler member; a second pneumatic coupler member, adapted to be carried on the trailer, including a conductive part to cooperate with the first-named coupler member, and having means for engaging said valve-closure to move the same to its open position when the towing vehicle and trailer are brought together to connect the same to enable the towing vehicle to draw the trailer, means for insulatingly supporting said second-named coupler member on the trailer, and an insulated electric conductor for the towing vehicle, with a contact associated therewith for electrically connecting the same to the first-named coupler member; and an insulated electric conductor carried for the trailer with a contact associated therewith in electrical contact with the second-named coupling member; all of said parts cooperating to establish an insulated electric circuit through the said pneumatic coupling members when the same are coupled together.

13. In a combined pneumatic and electric coupler, the combination of a frame, a pneumatic coupler member including a conductive part with a bore therein, means for insulatingly supporting the pneumatic coupler member on said frame, a second frame, a pneumatic coupler casing supported on said second frame, a pneumatic coupler member including a conductive part, said second pneumatic coupler member having a part to pass into said bore and having a substantially tubular body with an outwardly projecting flange on the same, insulation means formed in sections mounted on said coupler casing and receiving said flange between the same for insulatingly supporting said second named coupler member on the second frame, an insulated electric conductor on the first named frame located outside of said pneumatic connections and having a contact electrically connected therewith and touching the side of the first named conductive part, an insulated electric conductor carried on said pneumatic coupler casing and having a contact member connected therewith and attached to said flange between the said insulating sections; all of said parts co-operating to establish an insulated electric circuit through said pneumatic coupling members when the same are coupled together.

AMOS H. KIRKSEY.

REFERENCES CITED

The following references are of record in the file of this patent:

UNITED STATES PATENTS

| Number | Name | Date |
|---|---|---|
| 307,536 | Flad | Nov. 4, 1884 |
| 1,611,947 | Reid | Dec. 28, 1922 |
| 1,973,610 | Connors | Sept. 11, 1934 |
| 2,119,460 | Gurton et al. | May 31, 1938 |
| 2,263,114 | Winn | Nov. 18, 1941 |